(12) United States Patent
Coronado et al.

(10) Patent No.: US 7,861,117 B2
(45) Date of Patent: Dec. 28, 2010

(54) METHOD TO RECOVER FROM A BOOT DEVICE FAILURE DURING REBOOT OR SYSTEM IPL

(75) Inventors: Juan A. Coronado, Tucson, AZ (US); Aaron E. Taylor, Tucson, AZ (US); Christina A. Lara, Tucson, AZ (US); David W. Sharik, Tucson, AZ (US); Justin D. Suess, Tucson, AZ (US); Phu Nguyen, Tucson, AZ (US); Richard Cunningham, Tucson, AZ (US); Adote A. Tounou, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 12/146,087

(22) Filed: Jun. 25, 2008

(65) Prior Publication Data

US 2009/0327813 A1    Dec. 31, 2009

(51) Int. Cl.
*G06F 11/00* (2006.01)
(52) U.S. Cl. .............................. 714/36; 713/2
(58) Field of Classification Search .................. 714/36; 713/2
See application file for complete search history.

(56) References Cited

U.S. PATENT DOCUMENTS

| | | | |
|---|---|---|---|
| 6,785,838 B2* | 8/2004 | Lim et al. ...................... | 714/7 |
| 6,931,525 B2 | 8/2005 | Numata et al. | |
| 7,073,053 B1* | 7/2006 | Oz et al. ........................ | 713/2 |
| 7,111,202 B2* | 9/2006 | Cagle et al. .................... | 714/36 |
| 7,137,034 B2* | 11/2006 | Largman et al. .............. | 714/23 |
| 7,174,446 B2* | 2/2007 | Dennis et al. .................. | 713/1 |
| 7,231,515 B2* | 6/2007 | Taylor ............................ | 713/2 |
| 7,353,376 B2* | 4/2008 | Dennis et al. .................. | 713/1 |
| 2004/0078679 A1* | 4/2004 | Cagle et al. ................... | 714/36 |
| 2004/0199825 A1* | 10/2004 | Zeller et al. ................... | 714/36 |
| 2005/0038985 A1* | 2/2005 | Taylor ............................ | 713/2 |
| 2006/0107112 A1 | 5/2006 | Michaelis et al. | |
| 2006/0224880 A1* | 10/2006 | Hara et al. ...................... | 713/2 |
| 2006/0236150 A1* | 10/2006 | Lintz et al. ..................... | 714/6 |
| 2008/0091933 A1* | 4/2008 | Marks et al. ................... | 713/2 |

* cited by examiner

*Primary Examiner*—Marc Duncan
(74) *Attorney, Agent, or Firm*—Suiter Swantz pc llo

(57) ABSTRACT

A method of automatic recovery from a boot device failure and an initial program load (IPL) failure of an operating system (OS) comprises: receiving and complying with a user selected option of an action upon an event of a boot device failure and an IPL failure. The user selected option may consist of taking the action of attempting an auto reboot of the server with the selected boot device and continuing the reboot attempts using the reduced priority boot devices from the bootlist until detection of a boot success, or taking no action allowing for manual user intervention.

1 Claim, 1 Drawing Sheet

US 7,861,117 B2

METHOD TO RECOVER FROM A BOOT DEVICE FAILURE DURING REBOOT OR SYSTEM IPL

TECHNICAL FIELD

The present disclosure generally relates to the field of computer server recovery, and more particularly to a method that provides the capability for a computer server, such as the POWER5 Server, to dynamically recover in real time without user intervention from a failed reboot.

BACKGROUND

The IBM DS8000 storage controller is a dual processor complex controller. The dual processor complex controller includes two POWER5 based servers. A POWER5 server contains processors and memory needed to run the applications that manage the DS8000 functions. The AIX operating system (OS) is an open standards-based, UNIX operating system that allows a user to run the desired applications on IBM UNIX OS-based servers. The boot devices and the Service Processor (SP) are the POWER5 hardware of special interest to this invention.

Each POWER5 server in the DS8000 contains two boot devices. One boot device maybe be designated the primary boot device, and the other a mirror boot device. The boot devices contain the boot files to load the AIX kernel, the AIX Operating System and the DS8000 application program that performs the function necessary to manage the storage controller. In addition, the boot devices contain configuration files that are used to manage the hardware resources of the storage controller.

The Service Processor (SP) is a POWERPC controller embedded in a POWER5 server. The SP contains application programs and device drivers that are required for the functionality of the service processor hardware. The SP application programs are used to manage and monitor the POWER5 server hardware resources and devices. The SP provides functions to manage the automatic power re-start of a POWER5 server, to manage the selection of the boot devices, and the capability to modify the boot list. The auto restart (reboot) option, when enabled, may reboot the system automatically following an unrecoverable hardware or software related failure.

The SP provides several distinct surveillance functions. One SP surveillance function monitors the functionality of the firmware during the boot process, while another surveillance function monitors the health of the Operating System. The surveillance functions allow the SP to take appropriate action when the monitor function detects a failure. The SP can deallocate or deconfigure a hardware resource. The hardware resources deallocated or deconfigured are bypassed during the boot process.

In general, the configuration and management of each POWER5 server and the DS8000 hardware resources takes place through a Storage Hardware Management (S-HMC) console. The S-HMC is a stand alone workstation that provides both a Graphical User Interface (GUI) and a Command Line Interface (CLI). In reality, the S-HMC interfaces with the SP to provide a user the capability to perform configuration, resource management, and maintenance activities on a POWER5 server and additional hardware resources of the DS8000 storage controller. The S-HMC console provides among several functions the capability to remotely control the power management of each POWER5 server, such as the ability to manage the power of a POWER5 server.

The S-HMC, the POWER5 server and the Service Processor are interconnected through two 16-port Ethernet switches. Each POWER5 server, Service Processor, and the S-HMC connects to each switch. This configuration provides for a fully redundant management network.

During a reboot or Initial program Load (IPL) of a POWER5 server, the S-HMC displays progress codes. The progress codes are numeric characters which are displayed sequentially. The progress codes indicate the state of the reboot or IPL progress. If the reboot or IPL fails or is stalled, the displayed progress code indicates at which point the fail occurred. An indication that a reboot or IPL has failed is the fixed display of the same progress code.

Depending on the boot status failure, the required action necessary for repair may lead to a physical removal of the failed boot device, a replacement of the failed boot device, a modification of the boot list, or a rebuild of the boot devices. For example, when the boot is stuck with status 0557 (a failure to read the boot sector), the plan of action requires the pull of the failed boot device. The mirror boot device must then be used to retry the boot.

All the recovery actions of a failed reboot or a failed IPL require manual intervention from the system administrator or an IBM representative. The boot recovery action is prone to further problems due to user mistakes during the repair action. With manual intervention, it takes time to perform the repair actions. In addition, while the failure to boot or IPL persists, the DS8000 is in single logical partitioning (LPAR) mode. This increases the likelihood of exposure to a situation where the storage controller is not available if for some reason a failure occurs in the running server. This also affects overall system performance because the DS8000 performance has been fine tuned with the availability of both Power 5 servers in mind. Just as important, this could also increase warranty costs, as it can take several hours to provide on-site support, including diagnosis of the problem. This in turn could bring several more hours as the hardware used as boot devices (HDD) are not normal pieces of hardware carried by a customer engineer.

SUMMARY

A method of automatic recovery of an operating system (OS) from at least one of a boot device failure and an initial program load (IPL) failure including, but not limited to, receiving a user selected option of an action upon an event of a failure, complying with the user selected option without real time user intervention, further including: maintaining a bootlist for a server of a plurality of boot devices, further including: maintaining an order of selection of a selected boot device and a plurality of reduced priority boot devices on the bootlist, deallocating a failed boot device, reducing a priority of a boot device on the bootlist, removing a boot device from the bootlist, detecting a failure, attempting a reboot of the server and an IPL with the selected boot device, detecting success or failure of the selected boot device, notifying a user of the success or failure of the selected boot device, updating the order of selection of boot devices on the bootlist, selecting a reduced priority boot device from the bootlist, attempting a reboot of the server and an IPL with the reduced priority boot device, continuing the reboot of the server and the IPL attempts using the reduced priority boot devices from the bootlist until detection of a boot success and an IPL success, detecting no further boot devices available on the bootlist to successfully complete the boot success and the IPL success, and, notifying a user of the failure, receiving a user selected option of an action upon an event of a boot device failure, complying with the user selected option without real time user intervention, further including: maintaining a bootlist for a server of a plurality of boot devices, further including: maintaining an order of selection of a selected boot device and a plurality of reduced priority boot devices on the bootlist, deallocating a failed boot device, changing a priority of a boot device on the bootlist, removing a boot device from the bootlist, detecting a boot device failure, attempting a reboot of the server with the selected boot device, detecting success or failure of the selected boot device, notifying a user of the success or failure of the selected boot device, updating the order of selection of boot devices on the bootlist, selecting a reduced priority boot device from the bootlist, attempting a reboot of the server with the reduced priority boot device, continuing the reboot attempts using the reduced priority boot devices from the bootlist until detection of a boot success, detecting no further boot devices available on the bootlist to successfully complete the boot success, and notifying a user of the boot device failure. The method embodies a user selected option comprises: taking an action of attempting a reboot of a server with a selected boot device and continuing reboot attempts using a reduced priority boot devices from a plurality of boot devices on a bootlist until detection of a boot success, or, taking no action allowing for user manual intervention. The method embodies an additional aspect where the failure detected is an initial program load of an operating system.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
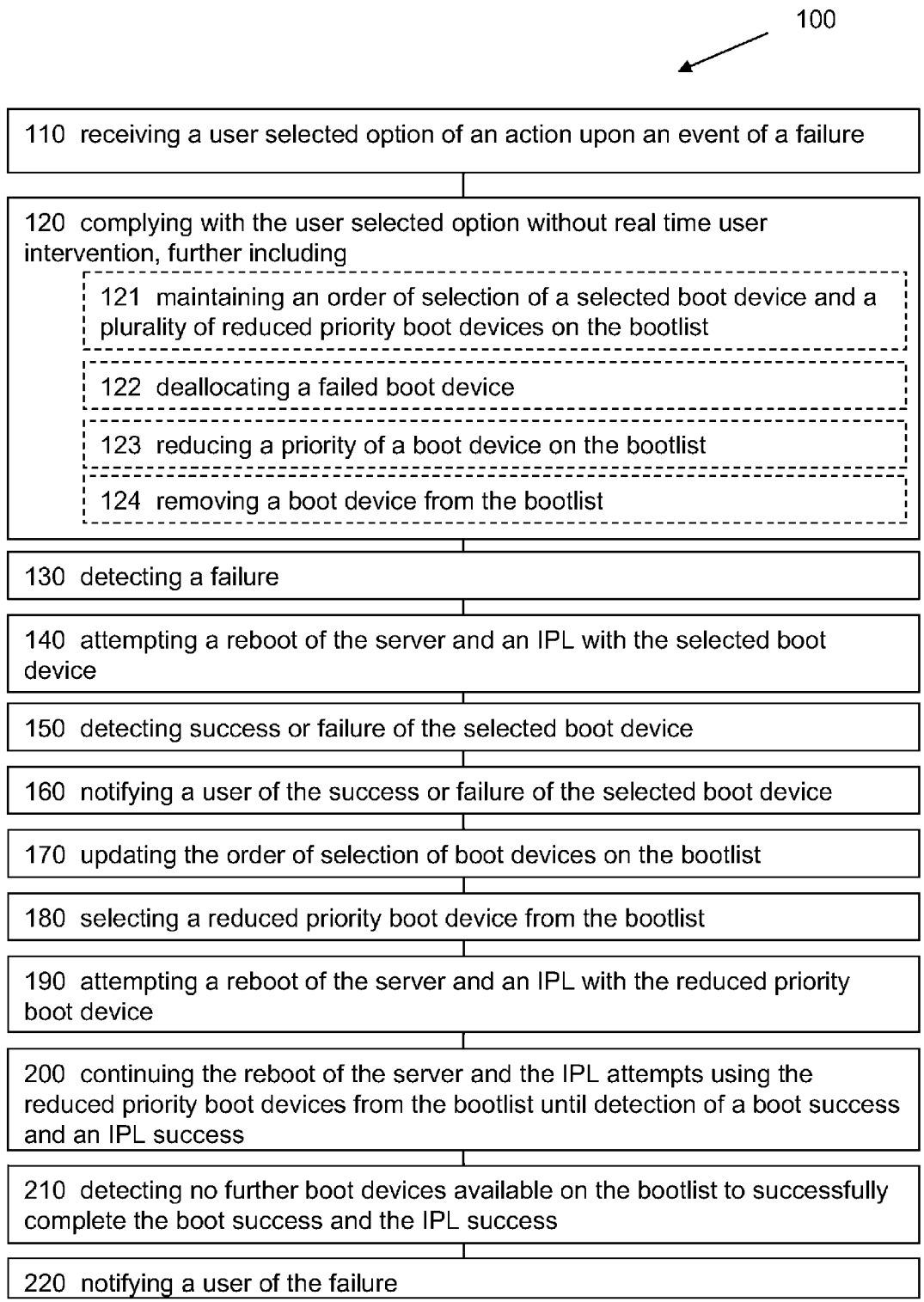
FIG. 1 is a flow diagram illustrating a method to dynamically, in real time and without user intervention, recover from a boot failure and an IPL failure of a POWER5 Server.

Reference will now be made in detail to the subject matter disclosed, which is illustrated in the accompanying drawings.

Method 100 provides the capability to dynamically, in real time and without user intervention, recover from a failed reboot or IPL of a POWER5 Server. The recovery action is based on a new option in the S-HMC allowing the user to select the type of action the Service Processor will take in the event of a boot failure or IPL failure 110,120. The actions may be to: maintain an order of selection of a selected boot device and a plurality of other devices usable for an OS boot 121, deallocate the failed boot device 122, reduce the priority of the boot device in the bootlist 123, remove the boot device from the bootlist 124, or to take no action allowing user to manually fix the boot or IPL problem. One action may be selected and the action may be changed at anytime.

When the SP detects a failure to boot or IPL from a boot device 130, the SP will check the action requested for a failure to boot the POWER5 server 110. The SP will then notify the user 160 and once SP has selected and executed the recovery action 110, the SP will initiate a reboot of the POWER5 server 140. If for some reason the reboot fails again, SP will take the same action using the reduced priority boot device on the bootlist 180. SP will continue to take actions 200, until the SP detects that it is impossible to boot the system because there are no longer boot devices available to successfully complete a boot or IPL of the OS and its application 210. In the event that no devices are available to boot the system, Method 100 will notify the user of the failure 220.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The invention claimed is:

1. A method of automatic recovery of an operating system (OS) from at least one of a boot device failure and an initial program load (IPL) failure, comprising:
   receiving a user selected option of an action upon an event of a failure;
   complying with the user selected option without real time user intervention, further including:
   maintaining a bootlist for a server of a plurality of boot devices, further including:
      maintaining an order of selection of a selected boot device and a plurality of reduced priority boot devices on the bootlist;
      deallocating a failed boot device;
      reducing a priority of a boot device on the bootlist;
      removing a boot device from the bootlist;
   detecting a failure;
   attempting a reboot of the server and an IPL with the selected boot device;
   detecting success or failure of the selected boot device;
   notifying a user of the success or failure of the selected boot device;
   updating the order of selection of boot devices on the bootlist;
   selecting a reduced priority boot device from the bootlist;
   attempting a reboot of the server and an IPL with the reduced priority boot device;
   continuing the reboot of the server and the IPL attempts using the reduced priority boot devices from the bootlist until detection of a boot success and an IPL success;
   detecting no further boot devices available on the bootlist to successfully complete the boot success and the IPL success, and;
   notifying a user of the failure.

* * * * *